Feb. 4, 1958 R. G. GOEKLER 2,821,946
INTERNAL ALIGNMENT APPARATUS FOR PIPE SECTIONS
Filed Jan. 31, 1956 3 Sheets-Sheet 1
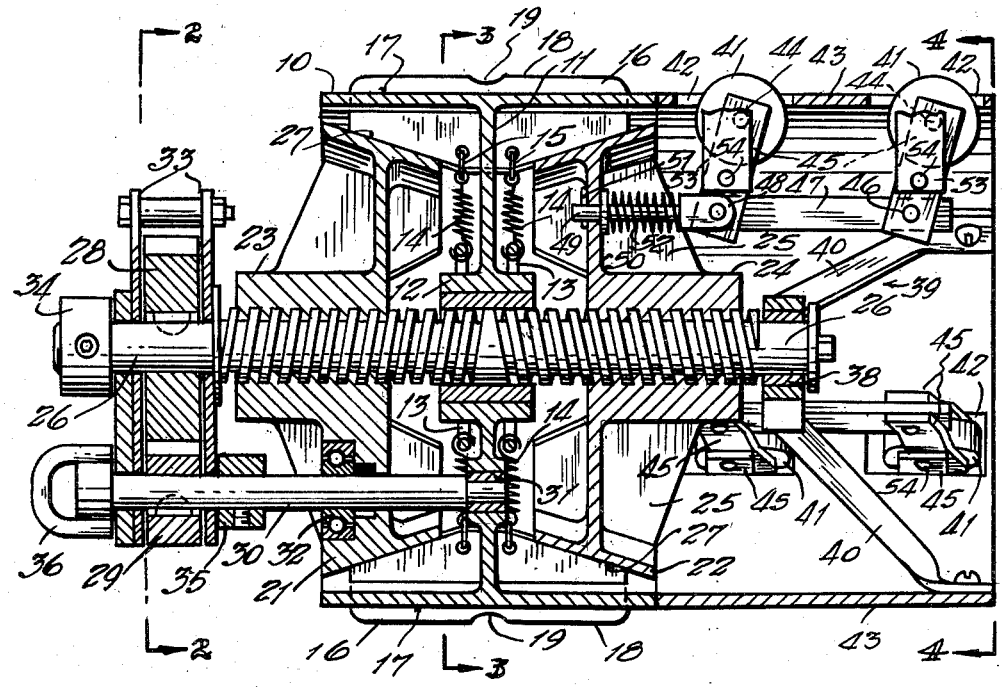
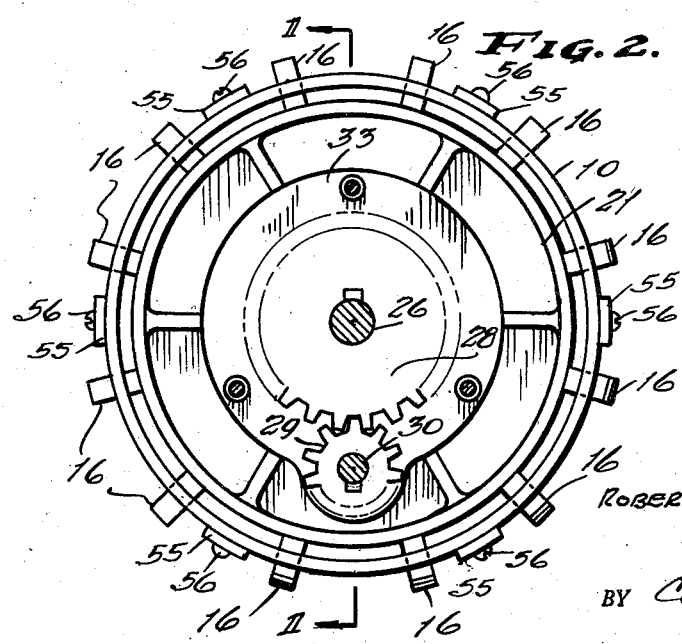
ROBERT G. GOEKLER
INVENTOR.
BY
ATTORNEY Robert G. Goekler
INVENTOR.

BY *Cecil L. Wood*
ATTORNEY

Feb. 4, 1958 R. G. GOEKLER 2,821,946
INTERNAL ALIGNMENT APPARATUS FOR PIPE SECTIONS
Filed Jan. 31, 1956 3 Sheets-Sheet 3
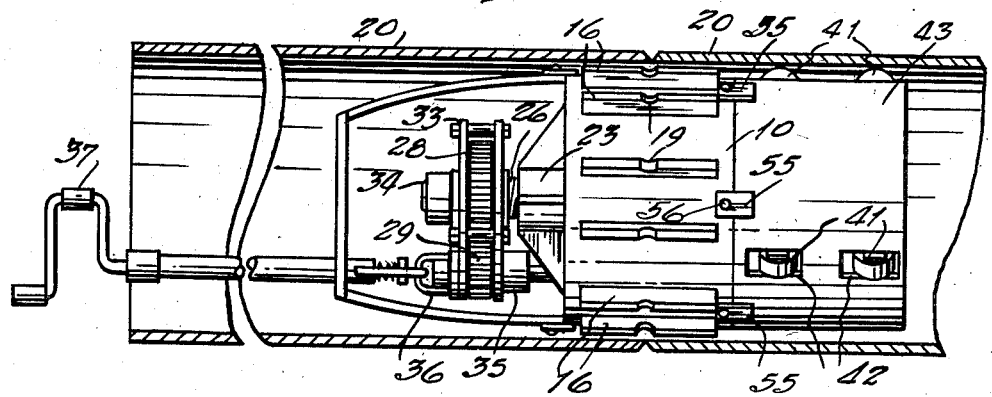
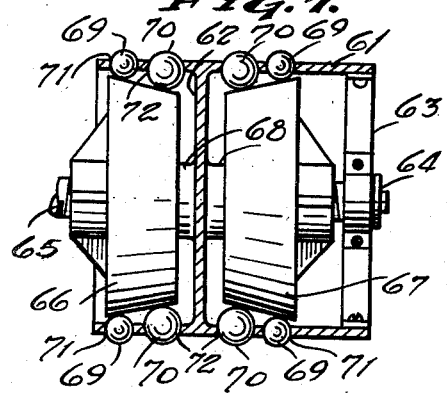
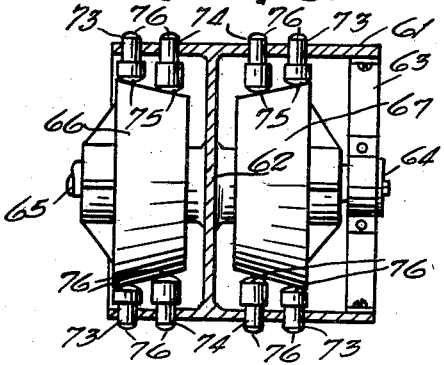
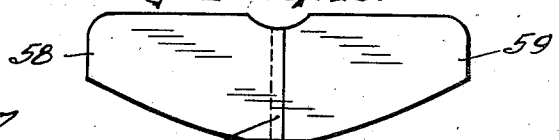
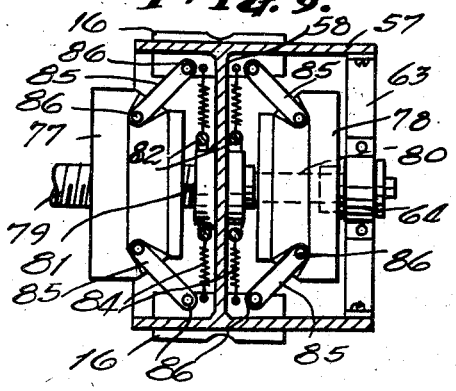
ROBERT G. GOEKLER
INVENTOR.
BY
ATTORNEY United States Patent Office 2,821,946
Patented Feb. 4, 1958

2,821,946

INTERNAL ALIGNMENT APPARATUS FOR PIPE SECTIONS

Robert G. Goekler, Fort Worth, Tex.

Application January 31, 1956, Serial No. 562,479

1 Claim. (Cl. 113—103)

This invention relates to apparatus for aligning pipe sections in a welded pipeline, and it has particular reference to a device capable of operation through a pipe section and positioning at the juncture of the section with others, and its principal object resides in the provision of apparatus which, when arranged between joined sections of pipe, will properly align the same axially for the purpose of welding the sections in a continuous string or tube which requires that the circumference of each section matches that of a companion section joined thereto.

Another object of the invention is that of providing apparatus for aligning pipe sections which embodies features by which the invention is expandable to the internal diameter of the tubing or pipe in which the device is applicable and to circumferentially align the sections so that both internal and external surfaces are in the same planes and, when welded, the continuous resulting tube, or pipeline, will be free of interruptions or uneven junctures capable of interfering with the flow of fluids therethrough.

A still further object of the invention resides in the provision of an expanding mechanism which is economical in design and structure, while capable of being readily installed through a pipe section and accurately positioned a juncture of the section with other already joined in a continuous tube and expanded to align the same with the pipeline or continuous tube to extend the latter.

Yet another object of the invention resides in the provision of apparatus in which is embodied a series of self-retracting expandable shoes adapted to be mechanically expanded to engage the inner surfaces of a pair of joined pipe sections whereby to align the same axially for permanent juncture by welding, and whereby any circumferential deformities in either section so joined can be corrected and matched with its companion section.

Broadly, the invention contemplates the provision of an aligning device for pipe sections in a welded pipeline wherein the several joined sections are evenly and properly aligned at each joint for welding so that a minimum of irregularity in internal flow surface in a continuous tube or pipeline will result.

While the foregoing objects are paramount, other and lesser objects will become manifest as the description proceeds taken in connection with the appended drawings wherein:

Figure 1 is a longitudinal sectional illustration, on lines 1—1 of Figure 2, of the invention in one form, showing the cylindrical body, the radially expansible aligning shoes, and the right- and left-hand threaded shaft for actuating the conical cams to expand the shoes.

Figure 2 is an end view of the invention, shown on lines 2—2 of Figure 1, illustrating the geared expanding mechanism, the shafts being shown in transverse section.

Figure 6 is a side elevational view of the invention in operative position in between two joined pipe sections, the latter being fragmentarily illustrated in longitudinal section.

Figure 7 is a side elevational view of a modification of the invention, the cylindrical body being shown in longitudinal section, wherein a series of balls are employed for aligning the pipe sections.

Figure 8 shows another modification of the invention in which a series of radially movable pins are extensible against the inner surfaces of the pipe sections, the cylindrical body being shown in longitudinal section.

Figure 9 illustrates still another modification of the expanding mechanism for the expansible shoes, showing a series of pivoted links actuating the same, the body being shown in section.

Figure 10 illustrates a sectional expanding shoe, in side elevation, and

Figure 11 is a top edge view of the shoe illustrated in Figure 10, showing the slidable association of the parts.

The prime object of the invention being to axially align pipe sections for welding together in a continuous string, or pipeline, it embodies features by which such operations can be accomplished expeditiously and accurately, with a minimum of effort, by expanding a plurality of aligning members radially and in unison so that a firm bearing is provided for the tubes to be joined in alignment.

A preferred form of the invention is shown in Figures 1 to 6, 10 and 1, while modified structures are illustrated in Figures 7, 8 and 9, the latter embodying features which provide for more positive movement of the pipe engaging elements by which the sections are axially aligned.

Figure 3:
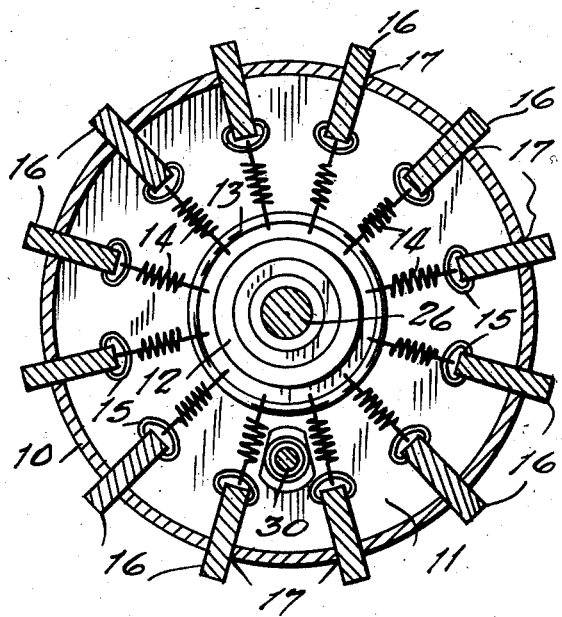
Figure 3 is a transverse sectional view of the invention, as shown on lines 3—3 of Figure 1, illustrating the spring tensioned aligning shoes extended radially through the cylindrical body.
Figure 5:
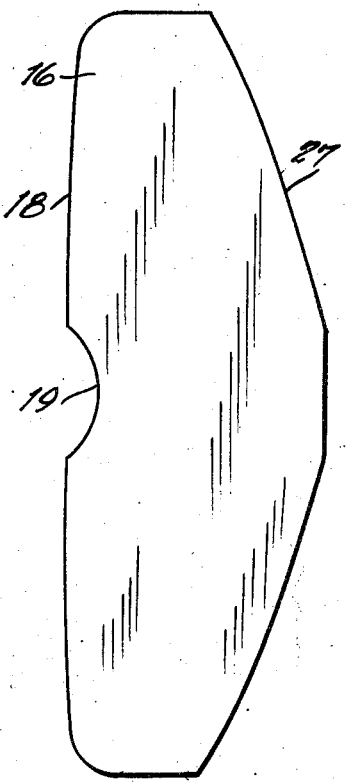
Figure 5 illustrates one of the aligning shoes in a side elevational view.
Figure 4:
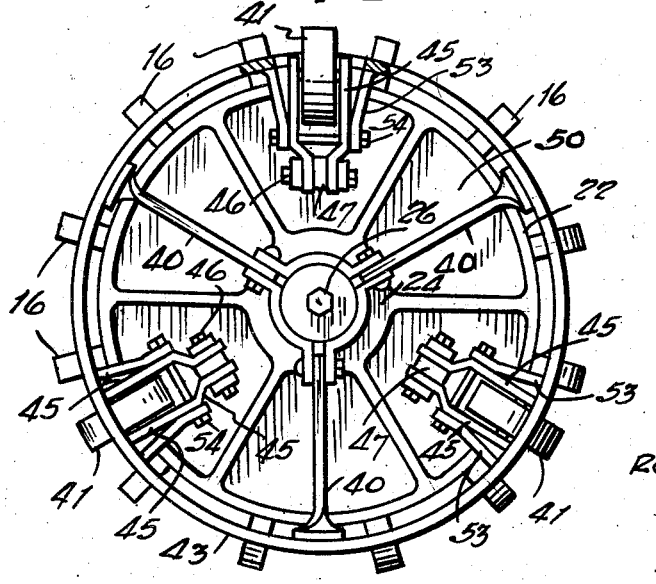
Figure 4 is a rear end elevational view of the invention as shown in Figure 1, and illustrating the centering rollers.

The invention has a cylindrical body 10 which has an integral flange 11 formed intermediate its ends and a hub member 12, cylindrical in form and having its axis aligned with the axis of the body 10, is formed centrally of the flange 11, as shown in Figure 1. Spaced around the hub 12 on each side of the flange 11 are loops 13 into which are secured the inner ends of pull springs 14 whose outer ends are connected to rings 15 secured in the inner edges of a plurality of shoe plates 16 arranged in slots 17 of the body 10 and spaced circumferentially thereof so that the members 16 are radial with respect to the axis of the body 10, as shown in Figures 2, 3 and 4.

Each of the shoe plates 16 have their outer edges 18 slightly arcuate, inclining from the center in which is formed a depression 19 which spans the joint between the pipe sections 20, as apparent in Figure 6, when the invention is applied thereto. On opposite sides of the flange 11, and within the body 10, are opposingly arranged frustro-conical cam members 21 and 22 which have hubs 23 and 24 and movable with respect to each other in opposite directions.

The hubs 23 and 14 of the members 21 and 22 are integrally connected by webs 25 and are internally threaded to receive a right- and left-hand threaded shaft 26 which extends through the hub 12 of the body 10, as shown in Figure 1, so that when the shaft 26 is rotated the members 21 and 22 are moved inwardly and outwardly in opposite directions to urge the shoe plates 16 outwardly in unison to be retracted by the springs 14 when the cams 21 and 22 are moved apart.

The association of the cam members 21 and 22 is more clearly shown in Figure 1 in which it is seen that the internal edges 27 of the plates 16 are inclined outwardly in opposite planes matching those of the opposing faces of the cam members 21 and 22 which bear thereagainst. A shoe plate 16 is shown in detail in Figure 5, and a modification thereof is illustrated in Figures 10 and 11 and will be described more in detail presently.

The shaft 26, which is free to rotate in the hub 12, but threaded in each of the hubs 23 and 24, has a gear 28 thereon which is meshed with a pinion 29 on an operating shaft 30 aligned with the shaft 26 and having its inner end journalled in a bearing 31 in the flange 11 while extending through, and rotative in a bearing 32, in the cam member 21, as shown in Figure 1. A cage 33 is provided to embrace and align the gear 28 and pinion 29 and is secured to the shafts 26 and 30 by collars 34 and 35. A loop 36 is secured to the outer end of the shaft 30 by which a crank 37 can be attached for rotating the same, as shown in Figure 6.

The opposite end of the shaft 26 is rotatably supported in a bearing 38 which is rigidly mounted in a spider 39 whose legs 40 are extended outwardly at obtuse angles and attached to the inner surface of the cylindrical body 10, as shown in Figures 1 and 4. Thus the right- and left-hand threaded shaft 26 is secured against longitudinal movement although rotatable to cause the members 21 and 22 to move toward and away from each other so that the shoe plates 16 can be extended in their slots 17 and permitted to be retracted by the springs 14.

The invention can be moved along internally of a pipe string or section on rollers 41 adjustably extended through slots 42 arranged about the circumference of a cylinder 43 adapted to be attached to the inner end of the body 10 and which has the same diameter, as shown in Figures 1, 4 and 6. The slots 42 are preferably longitudinally aligned in pairs, and spaced about the cylinder 43 so that the rollers 41 can have bearings radially against the inner surface of the pipe 20, as shown in Figure 6, and center the structure therein.

Each of the rollers 41 is pivoted on a pin 44 between straps 45 whose opposite ends are pivoted by pins 46 to a bar 47, as illustrated in Figures 1 and 4, and the inner ends of the bars 47 are connected to clevises 48 having stems 49 which project through the flange 50 of the inner cam member 22 and secured on their inner ends by keys 51, or other device permitting the stems 49 to be slidable therethrough. A compression spring 52 is arranged upon each of the stems 49, bearing between the flange 50 and the clevises 48, to normally extend the bars 47 and thus extend the rollers 41 through their slots 42.

Each set of straps 45 between which the rollers 41 are pivoted, is pivotally mounted between brackets 53 on a pin 54, the brackets 53 being integrally attached at their outer ends, to the inner surface of the cylinder 43 at each side of each slot 42. This arrangement is clearly shown in Figure 4. The cylinder 43 is rigidly secured axially of the cylindrical body 10 by straps 55 welded to the cylinder 43 and retained by bolts 56 through the body 10, as more clearly illustrated in Figure 6, so that the cylinder 43 can be detached, if desired, and the invention employed in the form shown in Figures 7, 8 and 9.

In Figures 10 and 11 is illustrated a modified shoe plate 57 which in outline is identical with the member 16 but comprises two slidably associated sections 58 and 59 joined by a tongue and groove arrangement designated by 60 to afford flexibility to compensate for perimetrical irregularities occurring between the joined pipe sections 20. By reason of the slidable connection between the sections 58 and 59 of the shoe plate 57 the sections can be self-aligning.

Other forms of the invention are shown in Figures 7, 8 and 9 which are modified only in the elements which bear outwardly against the inner surfaces of the joined pipe sections 20 to align the same for welding.

In Figure 7 is illustrated a cylindrical body 61 having a flange 62 formed therein near one end. At the opposite end of the body 61 is a bracket 63 supporting a bearing 64 concentrically thereof in which the inner end of a right- and left-hand threaded shaft 65 is journalled.

Frusto-conical cam members 66 and 67, having hubs 68, are threaded in opposing relationship on the shaft 65 to be moved in opposite directions when the latter is rotated, in the manner shown in Figure 6, so that the inclined faces of the cams 66 and 67 can be moved against the steel balls 69 and 70, projected through openings 71 and 72, in axial alignment with the body 61 and circumferentially spaced therearound, to urge the balls 69 and 70 in unison into engagement with the inner surfaces of the pipe sections 20. It will be observed that the series of balls 69 are smaller in diameter than the balls 70 thus conforming to the inclined faces of the cam members 66 and 67.

The structure shown in Figure 8 is identical with that illustrated in Figure 7 just described, with exception to the expanding elements 73 and 74 which comprise two sets of pins of different lengths and having parabolic heads 75 formed on their inner ends engaging the inclined faces of the cam members 66 and 67 which urge the same outwardly so that their tips 76 are against the inner surface of the pipe sections 20.

A practical embodiment of the invention is shown in Figure 9 which is positive in operation and features the shoe plates 16 of the structure shown in Figures 1 to 6, inclusive, but having a positive linkage between the members 16 and the actuating elements 77 and 78 which comprise hub members having concentric bores through which a shaft 79 is arranged. A portion 80 of the shaft 79 provides a spindle for the free end thereof in the member 78 while the opposite portion 81 is threaded through the member 77 to cause the latter to move toward and away from the element 78 when the shaft 79 is rotated.

The shoe plates 16 are connected to rings 82 arranged about the hub 83 of the flange 58 of the body 57, and on each side thereof, by pull springs 84. Links 85 connect the shoe plates 16 with the hub members 77 and 78 and are pivoted at their inner and outer ends by pins 86 to the plates 16 and the elements 77 and 78, respectively, so that as the latter are moved toward or away from each other the shoe plates 16 are extended radially against the inner surfaces of the pipe sections 20 on each side of the juncture therebetween, as exemplified in Figure 6, to evenly align these members.

While the invention has been described with considerable particularity in its several illustrated forms, it is obvious that certain changes in structure and modifications in design can be resorted to from time to time, by persons skilled in the art, without departing from the spirit and intent of the invention or the scope of the appended claim.

What is claimed is:

In an internal aligning clamp for pipe joints a cylinder having a diameter substantially less than the diameter of the pipe joints, the cylinder having a series of longitudinal slots formed therein equidistantly spaced therearound, an integral circular web in the cylinder intermediate its ends, the web having radial slots formed therein aligned with the slots in the cylinder and having a hub formed centrally thereof, the hub having opposing cylindrical flanges integral therewith and extending from each side, a shoe plate slidably arranged in each of the slots in the cylinder and the corresponding slot in the web, and slidable radially thereof, each of the shoe plates having a spring connecting it to the hub for normally urging the respective shoe inwardly and having angular inner edges inclined outwardly toward their opposite ends and their opposite edges, paired frusto-conical cams having internally threaded hubs in opposing arrangement engaging the inclined edges of the shoe plates, a right and left hand threaded shaft inserted through the first mentioned hub, between the cams, and threaded in the hubs of the cams, and means associated with the shaft for rotating it to move the cams in opposite directions in engagement with the shoes.

References Cited in the file of this patent
UNITED STATES PATENTS

| | | |
|---|---|---|
| 342,218 | Miller | May 18, 1886 |
| 963,603 | Lunceford | July 5, 1910 |
| 2,167,338 | Murcell | July 25, 1939 |
| 2,460,325 | Whitson et al. | Feb. 1, 1949 |